United States Patent [19]

Bernardini

[11] Patent Number: 5,144,623
[45] Date of Patent: Sep. 1, 1992

[54] SYSTEM FOR RECEIVING AND PROCESSING HDLC FRAMES ON A TIME DIVISION MULTIPLEX PCM TYPE LINK, ESPECIALLY FOR A DATA SWITCH

[75] Inventor: Fabrice Bernardini, Clamart, France

[73] Assignee: Alcatel Cit, Paris, France

[21] Appl. No.: 458,269

[22] Filed: Dec. 29, 1989

[30] Foreign Application Priority Data

Dec. 30, 1988 [FR] France .................... 88 17505

[51] Int. Cl.⁵ .............................................. H04J 3/00
[52] U.S. Cl. ......................................... 370/94.1; 370/99
[58] Field of Search ............... 370/94.1, 102, 99, 79, 370/110.1, 100.1

[56] References Cited

U.S. PATENT DOCUMENTS 5,056,084 4/1991 Le Corre .......................... 370/99

FOREIGN PATENT DOCUMENTS 0147086 7/1985 European Pat. Off. .
2608337 6/1988 France .

Primary Examiner—Douglas W. Olms
Assistant Examiner—Temesghen Ghebretinsae
Attorney, Agent, or Firm—Sughrue, Mion, Zinn, Macpeak & Seas

[57] ABSTRACT

A system for receiving and processing HDLC frames on a TDM PCM type link uses common circuitry for all the frame decoding and processing channels while allowing for the fact that each frame has to be processed in a specific way. It comprises a multiplexed HDLC frame receive device common to all the channels and supplying for each PCM channels in a frame a receive word comprising a data byte and status information relating to said byte. A transcoding device is addressed using information relating to the length of each received frame. A programmed automatic processor receives data bytes and processing information from the transcoding device in order to apply to said byte the processing indicated by the processing information.

11 Claims, 6 Drawing Sheets

SYSTEM FOR RECEIVING AND PROCESSING HDLC FRAMES ON A TIME DIVISION MULTIPLEX PCM TYPE LINK, ESPECIALLY FOR A DATA SWITCH

BACKGROUND OF THE INVENTION

1. Field of the invention

The invention concerns data transmission, in the telecommunications field, in accordance with the ISO standard protocol, and more particularly in accordance with levels 1 and 2 of the standard.

The invention is more particularly concerned with a system for receiving and processing HDLC frames on a time division multiplex PCM type link, especially for a data switch.

2. Description of the prior art

The specific implementation behind the development of the invention concerns an HDLC (High-level Data Link Control) transmitter/receiver with 32 channels multiplexed onto a PCM link and integrated into a PCM controller associated with a data switch, for example.

However, the invention encompasses other implementations in which an ISO level 2 frame format (in place of the HDLC format) is combined with multiplexing of multiple formatted channels onto the transmission link (in place of the PCM technique).

HDLC encoding entails serializing the data and formatting it into successive identifiable frames each comprising, in particular, a frame separator signal (or "flag") and a frame validation indication on two bytes (signature based on the bits of the frame) that is recomputed at the receiving end.

The PCM transmission technique time-division multiplexes N independent logical channels onto a single physical transmission line in the form of PCM frames each identified by a PCM frame start/end byte. Within each PCM frame each channel is reserved the same byte of predetermined rank.

The insertion of the HDLC frames into the PCM format at the transmitting end and then the recovery of the frames at the receiving end presupposes the provision of a specific system at each end of the transmission system. The invention concerns the receive part of a system of this kind.

There are already known systems for receiving HDLC frames transmitted on PCM type channels comprising either a dedicated machine based on slice processors or a plurality of processors each assigned to one channel of the PCM link. In the known system shown in FIG. 4 the HDLC frames are recovered channel by channel after demultiplexing at 45. This is effected by means of a specific line for each of the channels comprising a dedicated HDLC circuit 41 and a dedicated processor 42 associated with a buffer memory 43. Each of the lines 44 corresponding to a separate channel feeds a common remultiplexer memory 47 which concentrates the decoded frames 48 before they are sent over a processing bus 50 with processors 49 of ISO level 3. The processor 42 analyzes the byte and/or status signals supplied by the circuit 41. Knowing the transmission system used (CCITT No 7, X.25 or other protocol) and maintaining an up to date progress indication, the processor 42 is responsible for processing messages received, that is to say for determining for each byte received the operation that reception of the byte is to initiate; it accomplishes this operation by communicating as necessary with other processors involved.

This existing system is fully operational but has the disadvantages of a large number of components (one component for each channel) and the resulting complexity of management.

These disadvantages are particularly constricting in developing switching systems for a very large number of lines carrying large amounts of digital data. Until recently, 32-channel PCM links carried a limited number of logical channels (two, for example), the other channels being analog channels. It was therefore feasible, and sometimes essential, to process each channel separately, the multiplication of the components 41, 42, 43 on just a few parallel channels being compensated by the resulting flexibility of configuration.

There are now being developed PCM type transmit/receive systems comprising only digital channels. For example, the signalling transfer points (STP) designed to be installed on the French public switched telephone network require a processing capacity in the order of 500 64 kbit/s HDLC channels.

The increasing digitization of the network and rising data signalling rates are now making it possible to introduce services offering increasingly superior performance (ISDN) and represent a clear requirement for better performance PCM/HDLC systems.

In this line of thinking, it is known to implement the functions of the circuit 41 for multiple time-division multiplexed channels using a single multiplexed circuit having a channel status memory; on reception of a byte of each channel in a frame, the state of the channel (memorized in the previous frame) is read in this memory in order to resume processing of the channel where it left off, after reception of a byte of this channel in the previous frame.

In comparison with the FIG. 4 diagram, a single multiplexed HDLC circuit of this kind would be provided on the input side of the demultiplexer 45, rather than there being one such circuit for each channel on the output side of the demultiplexer. It would therefore be necessary to use the same number of processors 42 and memories 43 as there are channels, in order to meet requirements concerning the analysis and processing of received frames and messages that they contain.

One objective of the invention is to provide a system for receiving HDLC frames transmitted on PCM channels comprising means common to all the channels for analyzing and processing frames in order to avoid the proliferation of identical hardware means for each channel whilst allowing for the fact that each frame must undergo specific processing.

Another objective of the invention is to provide a frame receiving and processing system of this kind which, when associated with a standard processor, makes it possible to reduce the time to execute repetitive frame analysis tasks.

Another objective of the invention is to provide a system of this kind enabling variable duration processing of the received data. A further objective of the invention is to provide, for a system of this kind, a fast, simple design, hardwired device compatible with simultaneous coexistence of different protocols (for "25 example, CCITT No 7 and X.25) on the PCM channels.

SUMMARY OF THE INVENTION

The invention consists in a system for analyzing and processing HDLC frames transmitted on a multichannel time division multiplex PCM link comprising multiplexed means for receiving HDLC frames common to all the channels and supplying for each PCM channel in a frame a receive word comprising a data byte and status information relating to this byte, word analyzing and processing means comprising a channel data memory containing for each channel at least one progress indication which is a function of the receive words previously received on said channel, means for addressing and reading said data memory when a receive word is acknowledged and thus obtaining the channel data corresponding to said word, transcoding means for combining at least said status information for a receive word and at least said progress indication thereby producing processing information defining the processing to be applied to the received data byte and a progress indication modification indication, means for modifying said progress indication responsive to said modification indication and modifying it in said channel data memory and a programmed automatic processor receiving said data byte and at least said processing information in order to perform with respect to said byte the treatment indicated by said processing information.

Said HDLC frame receiving means and said word analysis and processing means advantageously communicate via an FIFO memory.

Said transcoding means advantageously cooperate with said automatic controller comprising:

means for processing the current data byte accompanied by the processing information supplied by said transcoding means;

means for executing said processing on said data block, said first and second means being cyclically activated for each new data byte.

In this way, said automatic controller is freed of the need for prior analysis of the information relating to the circumstances of transmission and of tracking reception of frames, and accomplishes directly the processing required by the reception of each byte.

Said status information relating to the current data advantageously comprises at least one of the following pieces of information: start of frame, end of frame with block validated, end of frame with no block validated, valid current byte, transmission or formatting error.

Preferably, the word analysis and processing means preferably comprise means for counting the number of bytes received for each HDLC frame received on each channel and said number of bytes information is supplied to said transcoding means to identify processing specific to each byte according to the rank of the byte in the complete frame of which said byte forms part. Also, said transcoding means also advantageously have an input for receiving status information corresponding to the occurrence of a synchronization signal, said information being provided by said HDLC decoding means for each received PCM frame synchronization byte.

In one preferred embodiment of the invention said word analysis and processing means comprise, for addressing said channel information memory, means for determining the number of the channel of the current received word cooperating with means for writing said channel information into the memory and means for reading said channel information addressed to said transcoding means. Said channel information preferably comprises at least the rank of the current byte in the current received frame on each channel or the status of the transmission channel.

According to another advantageous characteristic of the invention, said processing information supplied by the transcoding means comprises an automatic processor branch address supplying directly the address of the processing program to apply in respect of the received bytes. The automatic processor preferably further comprises means for triggering the next cycle of the word analysis and processing means after execution of the cycle for processing the current word.

Other characteristics and advantages of the invention will emerge on reading the following description of one preferred embodiment of the invention given by way of purely illustrative and non-limiting example and from the appended drawings.

DETAILED DESCRIPTION OF THE INVENTION

Figure 1:
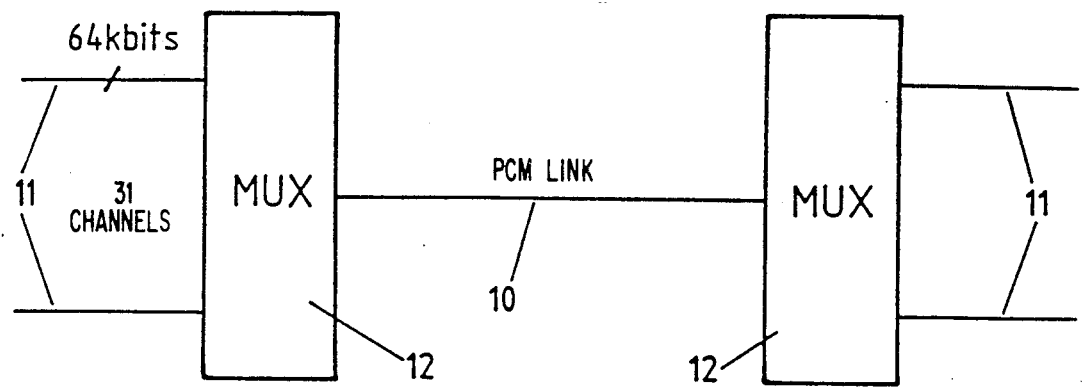
FIG. 1 is a schematic showing the transmission system of a 31-channel PCM link incorporating the transmission system in accordance with the invention.

As schematically shown in FIG. 1, the embodiment to be described hereinafter relates to a PCM type link 10 made up of 31 HDLC channels 11 multiplexed (at 12) with a synchronization 32nd channel (PCM standard).

To make this example more specific, it may be assumed that the HDLC channels operate at a data signalling rate of 64 kbit/s on a CEPT PCM type link (2.048 Mbit/s) using a CCITT No 7 type transmission protocol.

Figure 2:
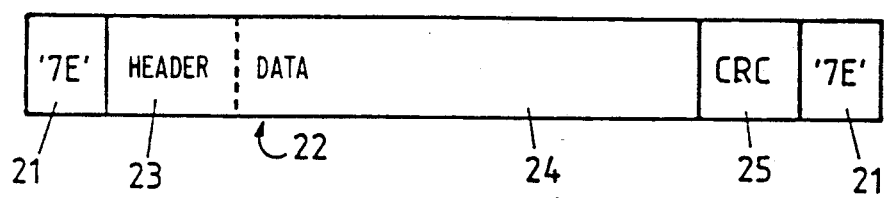
FIG. 2 is a schematic showing the structure of an HDLC frame.

FIG. 2 shows the structure of an HDLC frame, comprising:

a flag "7E"21 for separating the frames; the code "7E"- corresponds to the binary sequence 0 1 1 1 1 1 1 0;

N data bytes 22; the number N of bytes varies according to the software (1 000 bytes maximum, for example); these data bytes include the message header 23 consisting for example of a frame number, a number for the last frame sent by the remote system, a length indication for the message in the HDLC frame and the actual body of the message 24;

two frame validation bytes 25; these bytes are CRC (Cyclic Redundancy Check) bytes and their value depends on the bits of the frame; these two bytes consist, for example, of the remainder obtained on dividing the frame by a particular polynomial.

The HDLC frames are transmitted in succession on each channel with a frame separator 21 between successive frames. If there is no frame to transmit the separator flags 21 are transmitted continuously.

There are three types of HDLC frame in the CCITT No 7 protocol, characterized by their length:

>TSR padding frames comprising three bytes,
TSE status frames (characterizing the status of the link, for example on opening) comprising four bytes;
TSM message transmission frames comprising seven or more bytes.

The building of these HDLC frames from the source data sequences requires the use in the transmitter of a specific USART (Universal Synchronous/ Asynchronous Receiver/Transmitter) device, the functions of which include:

serializing the data, which reaches it in the form of consecutive bytes, for example;
eliminating occurrences of the symbol "7E" within the data frame to avoid any possibility of ambiguity with respect to the end of frame flags 21; this function is based on the so-called "transparency" rule which entails inserting zeroes into the useful data sequence immediately five consecutive bits at one are detected;
computing the two CRC bytes 25 to insert them at the end of the frame;
inserting frame separation flags 21 between uLC frames.

Of course, a complementary component is used in the receiver part to recover the transmitted data by implementing the following functions:
detecting and eliminating frame flags 21;
verifying that the useful data sequence 22 transmitted matches the two CRC bytes 25; if not, the receiver switches to an "error" state and, for example, commands retransmission of the frame;
extracting the zeroes inserted into the frame on transmission, according to the transparency rule;
deserializing the data.

Figure 3:
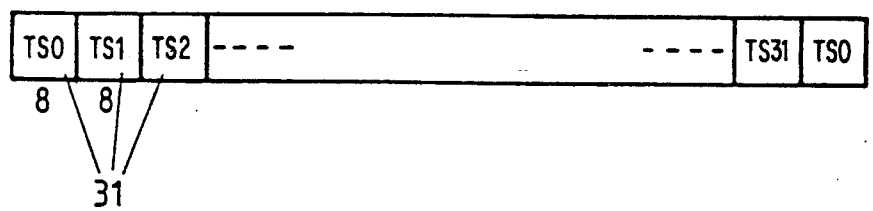
FIG. 3 is a schematic showing the structure of a PCM frame.
Figure 4:
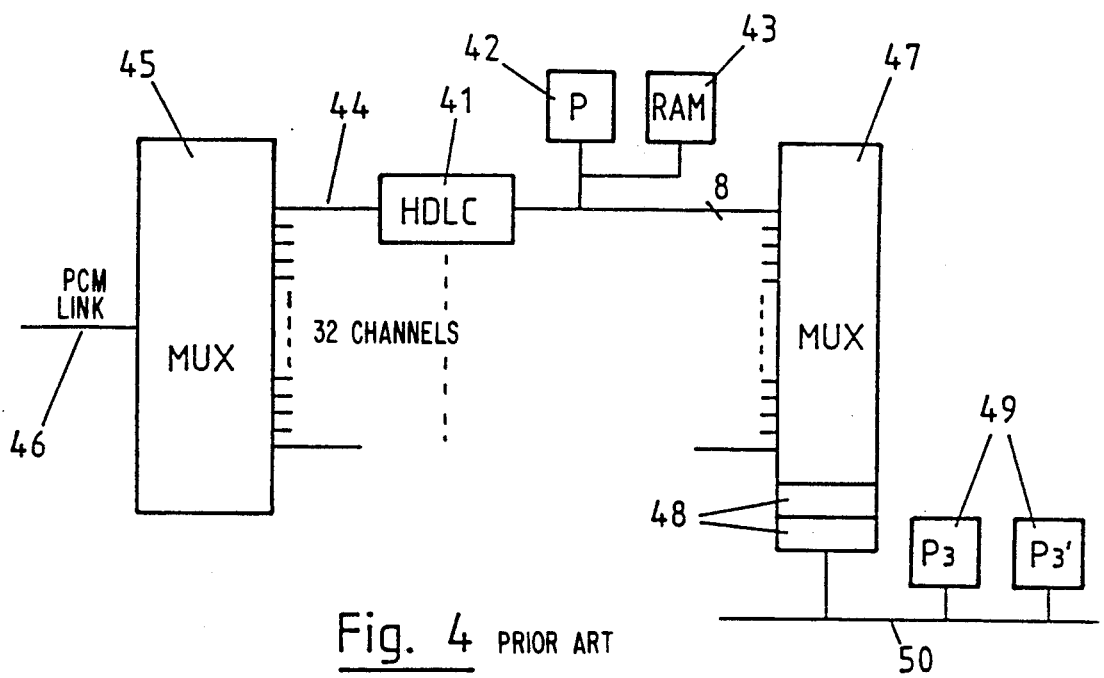
FIG. 4 shows a known implementation of a system for receiving HDLC frames on a PCM type channel with separate HDLC decoding for each channel.

FIG. 3 shows the structure of a PCM frame.

The data signalling rate of a multiplexed PCM frame built from 32×64 kbit/s channels is 32×64 kbit/s 2.048 Mbit/s. The data is transmitted in consecutive blocks of 256 bits as shown in FIG. 3, repeated continuously. The block comprises 32 time slots 31 (TS0, TS1, TS31) each comprising eight bits. The byte TS0 contains a synchronization signal. The bytes TS1 through TS31 each correspond to a different transmission channel. From the point of view 10 of the transmitter or the receiver, the data from each subscriber is sampled and sent every 256 bits, multiplexed with the data of the parallel channels.

Where necessary, the byte TS16 corresponds to signalling data specifying the use of each of the bytes TS1, TS2, etc.

Figure 5:
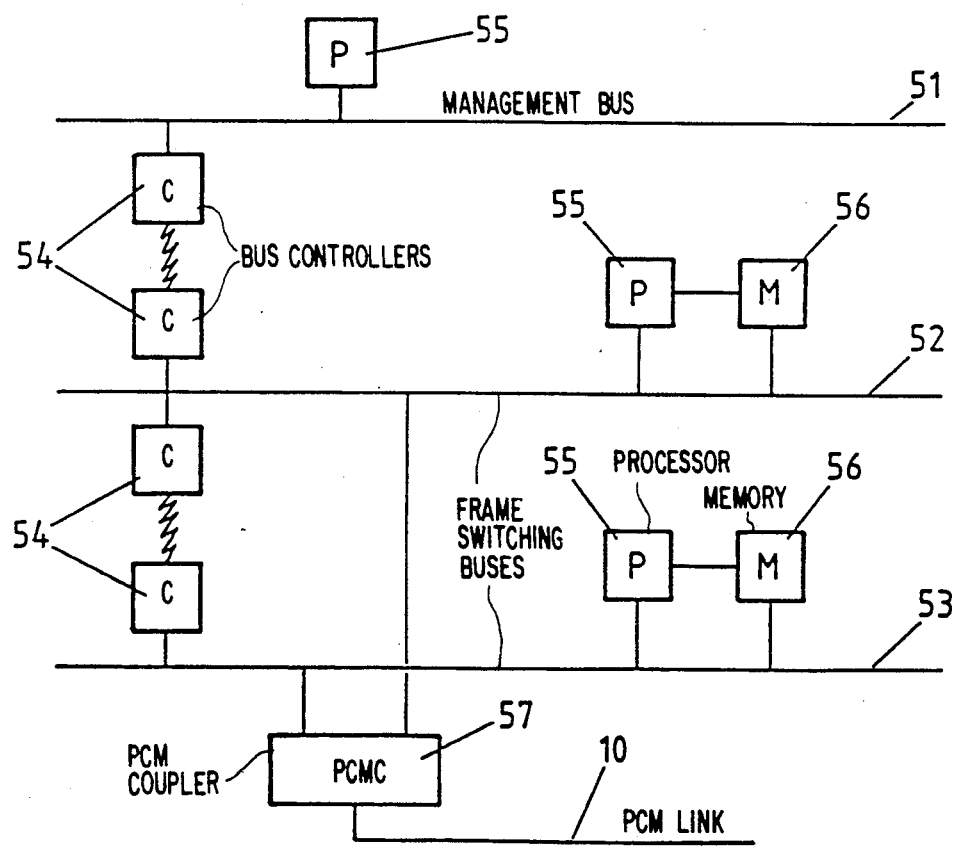
FIG. 5 is a schematic showing the implementation of a PCM controller in a data switch.

The embodiment of the system in accordance with the invention will be described in more detail in relation to a data switch as shown in FIG. 5.

A data switch of this kind comprises, for example, a multibus multiprocessor system including:
a management bus 51;
at least one frame switching bus 52, 53 adapted to process received data and to regroup it for retransmission to appropriate transmission lines 10;
connecting buses to the transmit/receive lines 10.

The system buses 51, 52, 53 are interconnected by pairs of bus controllers 54 which enable the processors 55 connected to each bus to communicate with each other or with slave modules such as memories 56.

Figure 6:
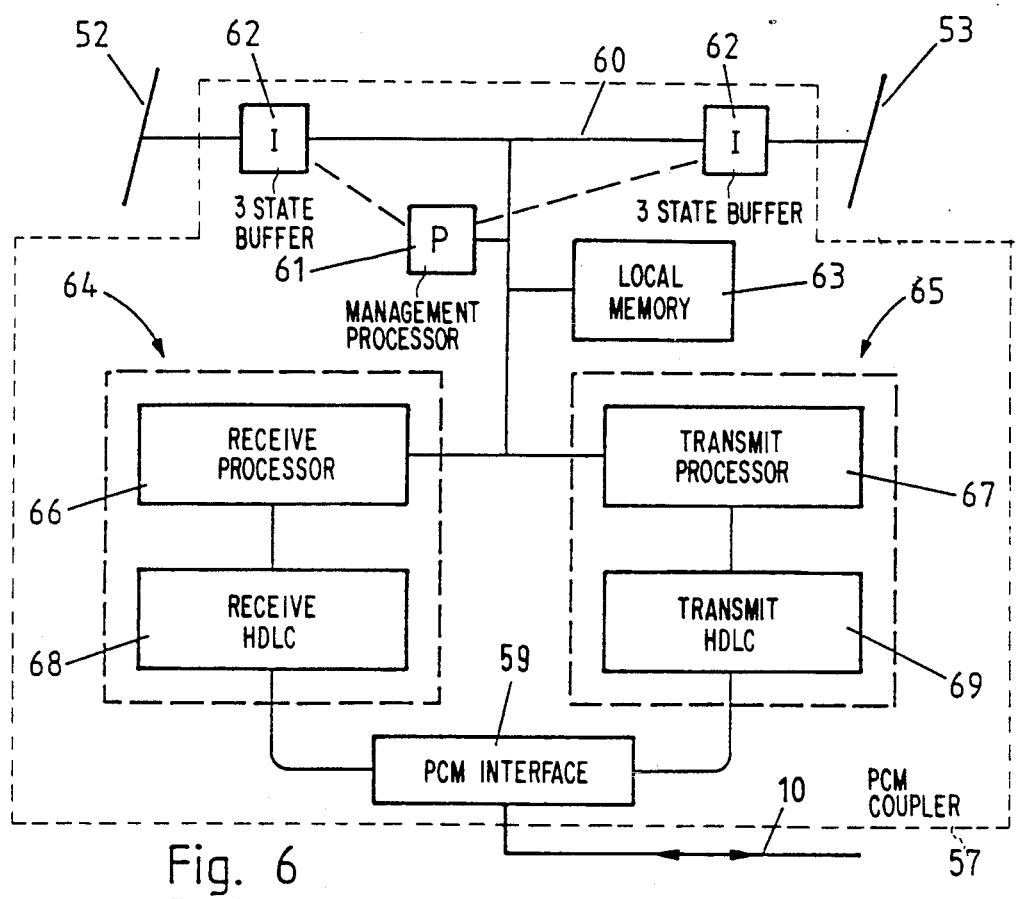
FIG. 6 shows a PCM controller to which the transmission system in accordance with the invention can be applied.

The connection to a PCM link 10 is made through a PCM controller 57 preferably connected in parallel to two buses 52, 53 for security reasons. Only one of the two interfaces between the PCM controller 57 and the buses 52, 53 is active at any particular time, under the control of an access management processor 61 (FIG. 6). The second interface may be activated should the first fail, for example.

FIG. 6 shows the structure of a PCM controller of a type in which the invention may be used.

The PCM controller is connected to the two buses 52, 53 of the data switch by means of two tristate buffer circuit type isolating circuits 62 controlled by the management processor 61.

The management processor 61 has additional functions:

it cooperates with the processors connected to the buses 52, 53 to manage the source data frames and the error rates;
it takes part in management of the local memory 63 of the PCM controllers;
it monitors congestion on and the data signalling rate of the local bus 60 of the PCM controller and manages the routing of data on the local bus 60;
it manages time-delays activated on transfer of data on the bus, pending acknowledgements of reception;
it sends instructions to the transmit processor 67 over the PCM link 10.

The PCM controller further comprises a local memory 63 and two processing branches 64, 65 respectively corresponding to the receive and transmit circuits of the controller. These circuits 64, 65 cooperate with a common PCM interface 59 connected to the PCM link 10. Each of the circuits 64, 65 includes a processor 66, 67 and an HDLC circuit 68, 69 incorporating the transmit or receive USART functions as described above.

The invention is more particularly concerned with the structure and the operation of the circuit 64 in respect of operations for receiving HDLC frames transmitted on the PCM link 10.

Figure 7:
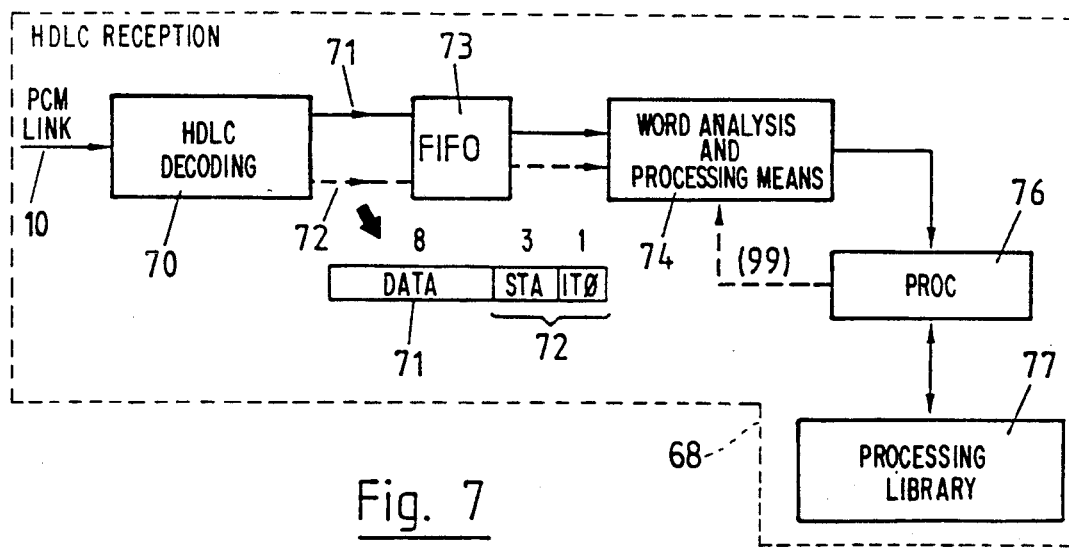
FIG. 7 shows a preferred embodiment of the word analysis and processing means of the invention.

FIG. 7 is a schematic showing the main component parts of the receiving system in accordance with the invention.

It shows:
means 70 for decoding HDLC frames received from the multichannel PCM link 10 and supplying at the output the usable data 71 extracted from the HDLC frames and status information 72 characterizing the data;
an FIFO memory 73 for temporarily storing the data 71 and the status information 72; the FIFO 73 serves as a buffer memory between the decoding means 70 and the word analysis and processing means 74 (alternatively referred to as a receive word analyzing means);
word analysis and processing means 74 receiving at the input the information from the FIFO 73;
an automatic processor 76 which periodically reads the output of the word analysis and processing means 74 in order to command selective processing as appropriate to each byte received by means of a library 77 of processing routines; the automatic processor 76 is also responsible for triggering (at 99) each new operating cycle of the word analysis and processing means 74.

The HDLC decoding means 70 operate as follows:

As already mentioned, the PCM link carries 32 time slots. There are therefore a maximum of 31 usable channels (TS1 through TS31) and a synchronization channel TS0. The means 70 remove the HDLC envelope from the data received from the PCM link and supply the useful data at the rate of one information item per time interval (3.8 μs, for example).

In more precise terms, the means 70 output for each PCM frame received one byte 71 for each of the 32 channels of the PCM link. However, it is evident that the HDLC decoding deprives the PCM channel bytes of a number of bits (transparency, CRC, separator flag bits). Consequently, the means 70 operate as follows:

they transmit a meaningless byte accompanied by a "meaningless byte" indication when it is not possible to send a complete byte;

they store the incomplete byte in means (specific to each channel) for temporarily storing the value of a byte;

they further fill the temporary storage memory of the channel from the next PCM frame so as to complete the useful data byte of the channel. The useful byte is then sent to the FIFO 73 with status information signifying "valid byte".

The data stream 71 as sent to the FIFO 73 therefore has the following format:

```
. synchronization code (TS0 detection),
. channel 1 word,
. channel 2 word,
. channel 3 word,
. . . . ,
. . . . ,
. channel 30 word,
. channel 31 word,
. synchronization code (TS0 detection),
. channel 1 word,
. channel 2 word,
. . . . ,
. . . . ,
. etc.
```

A word comprises a data byte 71 (part-frame) accompanied by status information 72, specifying the nature of the byte (meaningless byte, valid byte start of frame, end of frame, error, etc). This information is coded on four bits s0 through s3 constituting three bits of byte STA and a synchronization bit (s3=TS0):

| s3 | s2 | s1 | s0 |   |
|----|----|----|----|---|
| 0  | 0  | 0  | 0: | meaningless data byte |
| 0  | 0  | 0  | 1: | flag detected (useful when starting up) |
| 0  | 0  | 1  | 0: | valid data byte |
| 0  | 0  | 1  | 1: | (not used) |
| 0  | 1  | 0  | 0: | end of frame (CRC valid) |
| 0  | 1  | 0  | 1: | end of frame with CRC error |
| 0  | 1  | 1  | 0: | detection of an execution suspension cause (Abort) (7 consecutive bits at "1") |
| 0  | 1  | 1  | 1: | format error |
| 1  | x  | x  | x: | "TS0" detected |

The data stored in the FIFO 73 is then read by the word analysis and processing means 74.

Figure 8:
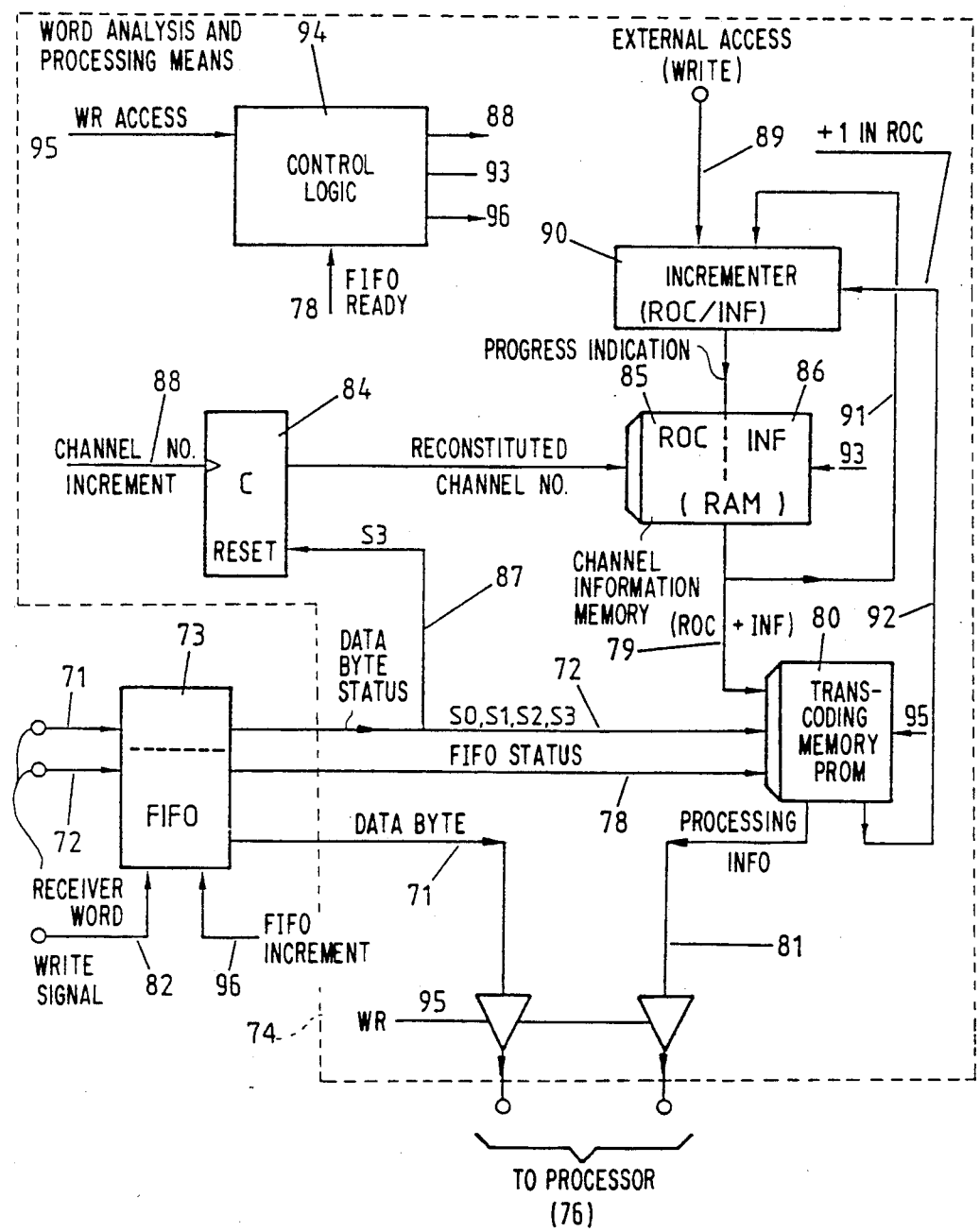
FIG. 8 is a schematic showing the main circuits constituting the word analysis and processing means of the HDLC frame receiving and processing system in accordance with the invention.

An advantageous embodiment of the word analysis and processing means 74 is shown in FIG. 8.

The central unit of the word analysis and processing device is the transcoding read-only memory 80.

This ROM receives from FIFO 73, the status information 72 and information 78 as to the status of the FIFO 73, together it receives, from a channel information memory 85, an information 79 relating to the status of the PCM channel (INF) and the rank of the current byte in the current frame (ROC). At the output of means 74, the transcoding memory 80 supplies information 81 governing appropriate processing of the current data 71.

The processing information 81 is read at the same time as the data 71 by the automatic processor 76 which thereby identifies the appropriate processing for the outgoing data.

The transcoding memory 80 operates in conjunction with the following circuits:

the FIFO 73 for input of data to be processed delivered by the upstream HDLC circuit 70, with its write signal;

a five-bit counter 84 reconstituting the (channel number being worked on and used to point to the channel information memories 85, 86 (eight bits per channel).

The counter 84 is reset (at 87) when the TS0 code is present. It is not clocked on (at 88) if the FIFO memory 73 channel is empty, otherwise it is incremented. Clocking occurs at the end of a cycle, enabling the use of ordinary components.

The channel information memories 85, 86 receive data from an operator 90 and include two information fields:

INF field 86: specifies the status of the channel (in service, not in service, byte counting mode at N7, etc) and the protocol type for the channel; this information comes from the external link 89; the channel information 86 is set at initialization time, but can be modified at any time;

ROC ("rank of received byte") field 85: this is a four-bit counter that is clocked on (or not) as each byte is received. The counter is incremented by the operator 90 and enables specific processing of frame header bytes and identification of the nature of the frames from their length (TSR padding frames and TSE status frames at N7, useful message frames, etc).

The ROC field is cleared in response to the "end of frame or fault detected" event but retains its value in the "incomplete byte" case.

Figure 10:
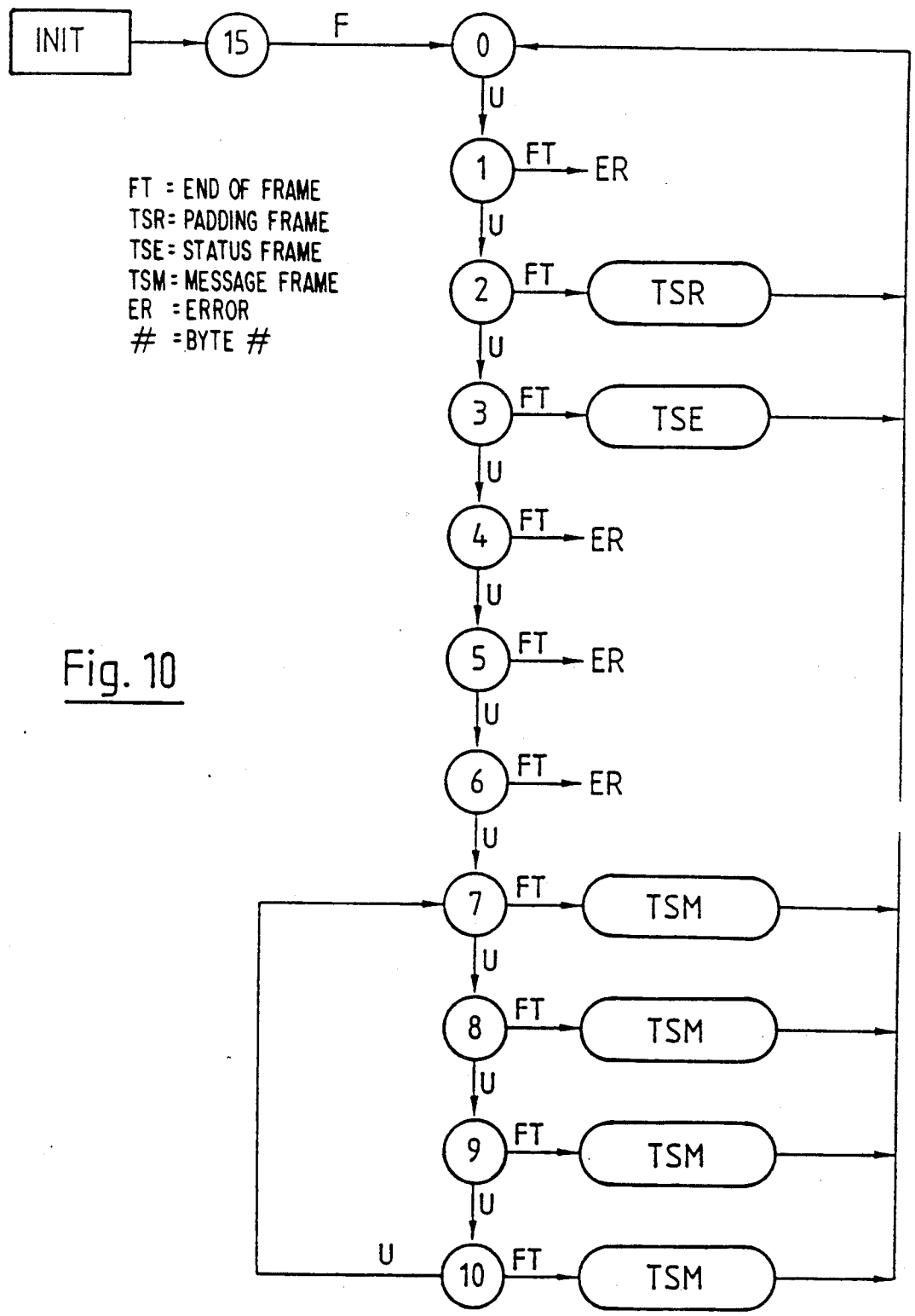
FIG. 10 shows the sequencing of a word analysis and processing device read cycle by the automatic processor in accordance with the invention.

Processing the rank of the current byte enables selective processing of each of the frames received according to its length. As shown in FIG. 10, it is possible to identify the TSR padding frames (two bytes), the TSE status frames (three bytes) and the TSM message frames (at least seven bytes).

The state diagram is explained as follows:

A word analysis and processing device incrementer 90 increments the ROC field by one each time a valid byte received from the FIFO 73 is recognized for a given channel. As soon as the end of frame byte (FT) is received, the length of the frame and therefore the nature of the frame (TSR, TSE, TSM) is identified.

If the length of the frame does not match any of the possible cases the system goes to the ER error processing routine.

Looping on the final four values assists the processor to process message frames (length overshoot test on one byte from four, multi-DMA function, etc).

An operating cycle of the means 74 from FIG. 8 begins with the reception (at 95) of a triggering WR signal from the automatic processor 76 when the latter is ready to receive and to process a byte received on one of the channels of the PCM link 10.

This signal opens the switches which transfer the data signal 71 and the processing information 81 to the automatic processor 76, but the information in question is not yet ready at this time.

The signal 95 further triggers the operation of control logic which produces control signals needed for a complete operating cycle of the device 74. However, the absence of the FIFO ready signal 78 inhibits any such cycle.

Figure 9:
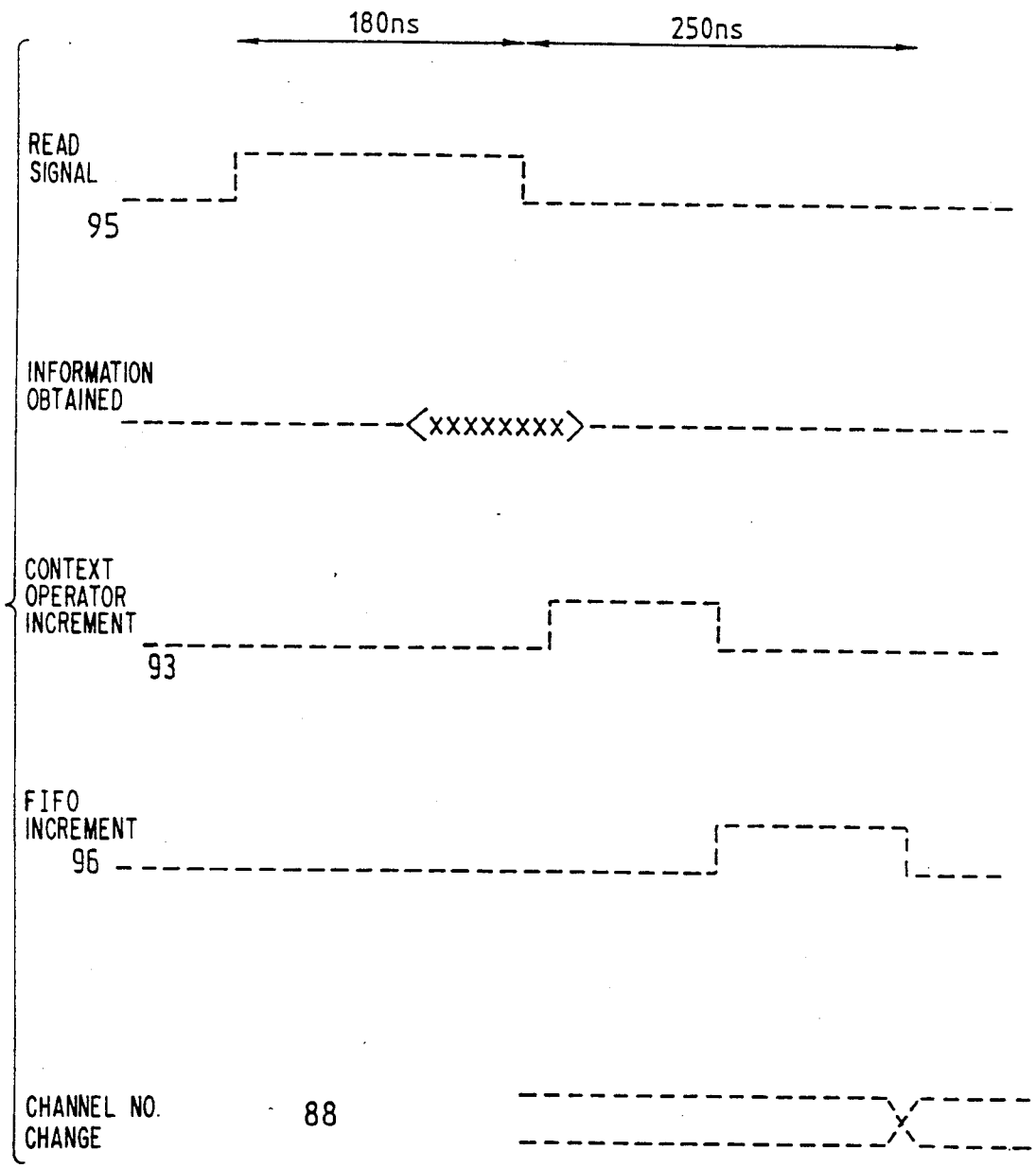
FIG. 9 is a state diagram schematically representing frame recognition on the basis of usable bytes in the complete frame.

The signal 95 also causes a read cycle in the memory 80 constituting the transcoding device. As shown, the address is made up of the signals 79, 72, 78 characterizing the status of or the type of protocol applied on the channel in question (INF), the number of bytes received since the start of a current frame (ROC), if appropriate, status information depending on the circumstances of routing of the received byte or its place in the frame (90 through 93), as shown in the table above, and the status (empty or occupied) of the FIFO, as explained above. The direct response of the transcoding device is to supply the information written at this address which includes processing information identifying (as explained previously) a program that must be executed in response to the data byte 71. As shown in FIG. 9, this information is available in the last third of a 180 ns time interval at the end of which the automatic processor 76 performs the read operation. The automatic processor 76 therefore receives in a very short time a byte 71 and processing information enabling it to access without preliminary operations the program for processing this byte. The timesaving is important given that, having to process the bytes arriving from the various channels at the rate of one byte every 3.88 μs and differing in terms of the protocol channel status, current frame type and progress in the reception of a frame, the programmed automatic processor 76 would otherwise have to begin by carrying out a large number of successive operations before being able to identify which processing program should be applied. It might even be the case that, unless an ultra-fast (and therefore very costly) processor were used, the automatic controller 76 would be incapable of processing the 31 channels of a CEPT type PCM system.

Applied to the incrementer 90, the signal 92 causes the information ROC+INF previously read and available at the output of the memory 85, 86 to be returned to the input of this memory either in exactly the same state or with the ROC field incremented, as explained above. When the logic 94 thereafter produces the signal 93 applied to the memory 85, 86 the information (possibly incremented by the incrementer 90) is rewritten at an address which is then always that of the channel in question.

The signal 96 is then generated by the logic 94 and it is applied to the FIFO increment input commanding a read operation concerning the next channel.

The end of the signal 96 produces the transient signal 88 which increments the channel counter 84. Absence of the signal 93 causes the memory 85, 86 to be read, supplying the ROC+INF information on the next channel, so that this information is available immediately the automatic processor asks for the next byte, which returns to the start of the operating cycle just described.

There is claimed:

1. A system for analyzing and processing HDLC frames transmitted on channels of a time division multiplex PCM link having multiple PCM channels, said system comprising:
    receiving means for receiving HDLC frames, said receiving means being common to all the PCM channels of said PCM link and supplying, for each PCM channel of the PCM link, a receive word comprising a data byte and status information relating to said data byte;
    receive word analyzing means, comprising:
        a channel information memory storing channel information for each PCM channel, said channel information including at least one progress indication which is a function of the number of receive words previously received on said channel;
        means for addressing and reading said channel information memory when a receive word is supplied by said receiving means, to thereby obtain the channel information corresponding to said receive word;
        transcoding means for combining at least said status information for a receive word and at least said progress indication thereby producing processing information defining processing to be applied to said data byte, said transcoding means also supplying a modification signal to modify said progress indication;
        modifying means responsive to said modification signal for modifying said progress indication and wiring the modified progress indication in said channel information memory; and
    a processor receiving said data bye and at least said processing information for processing said data byte in accordance with said processing information.

2. A system according to claim 1 further comprising a FIFO memory between said receiving means and said receive word analyzing means.

3. A system according to claim 1 wherein said status information relating to said data byte designates at least one of the following: frame start, frame end with frame validation, frame end with no frame validation, current valid byte, transmission or formatting error.

4. A system according to claim 1 wherein said receive word analyzing means comprise means for counting the number of bytes received for each HDLC frame received on each channel, and wherein the counted number of bytes is supplied to said transcoding means in order to identify specific processing of each byte according to the location of said each byte in the frame.

5. A system according to claim 1 wherein for each synchronization signal of a PCM fame said receiving means generates synchronization indicating the occurrence of a synchronization signal, said synchronization status information being supplied to said transcoding means.

6. A system according to claim 1 wherein said channel information memory is addressed by channel number means for determining the channel number of a current receive word and cooperating with writing means for writing said channel information in the channel information memory, and is addressed by reading means for reading said channel information for further processing by said transcoding means.

7. A system according to claim 6 wherein said channel information comprises at least the location of the current byte in a current HDLC frame receive in each channel or the status of the PCM channel.

8. A system according to claim 1, wherein said processor comprises:

first means for a current data byte together with the corresponding processing information supplied by said transcoding means, and second means for processing said data byte, said first and second means being cyclically activated for each new data byte.

9. A system according to claim 1 wherein said processor comprises means for triggering a new cycle of said receive work analyzing means after processing each data byte.

10. A system according to claim 1 wherein said transcoding means comprises a ROM.

11. A system according to claim 1 wherein said processing information supplied by said transcoding comprises a logic address for branching to a processing program.

* * * * *